April 22, 1952  W. F. DELAMETTER  2,594,134
STUFFING BOX ASSEMBLY
Filed May 16, 1949

INVENTOR.
W.F. DELAMETTER
BY Hudson & Young
ATTORNEYS

Patented Apr. 22, 1952

2,594,134

UNITED STATES PATENT OFFICE 2,594,134

STUFFING BOX ASSEMBLY

Walter F. Delametter, Phillips, Tex., assignor to Phillips Petroleum Company, a corporation of Delaware Application May 16, 1949, Serial No. 93,518

7 Claims. (Cl. 308—36.3)

This invention relates to stuffing box assemblies. In one specific aspect it relates to high-pressure fluid-tight stuffing box assemblies for packing a rotating shaft, which shaft extends through a wall having high pressure on one side of said wall. In another specific aspect it relates to stuffing boxes for rotating shafts in meters, which shaft means rotate accurately and with a minimum of friction but without loss of fluid pressure.

Extreme difficulty has been experienced in the stuffing box in packing the rotating shafts of recording pressure meters of the orifice meter type. Gas pressures as high as 1500 p. s. i. must be packed off and at the same time the shaft means rotate freely under the slightest force of the float or other actuating mechanism in order that the meter may record small differences in pressure, liquid level, or whatever the meter is recording, depending upon the construction of the meter. Many of the prior art stuffing boxes have pressure tight bearings which must be lapped in by hand by expert labor, and when the same are used in corrosive service, such as in the metering of gas or gasoline containing hydrogen sulfide and moisture these bearings become corroded and fouled thereby causing the meter to record incorrect data. Another difficulty is that the prior art stuffing boxes cannot be removed for service, repacking or repair without disturbing the rotating shaft and element attached thereto. The prior art stuffing boxes have to compromise between a gas-tight seal and accurately reading the meter, because when one is achieved the other cannot be attained.

One object of my invention is to provide an improved stuffing box assembly.

Another object is to provide a high-pressure fluid-tight stuffing box assembly for packing a rotating shaft in a meter.

Another object is to provide a stuffing box assembly in which the sealing means comprises packing rings retained by a gland inserted in the high-pressure end of the stuffing box.

Other objects are to provide a stuffing box free from corrosion, excess friction expensive hand lapped bearings, which stuffing box is simple in construction, easy to service, repack and replace, and which is simple and rugged in construction. Numerous other objects and advantages will be apparent to those skilled in the art upon reading the accompanying specification, claims and drawings.

In the drawings.

Figure 1:
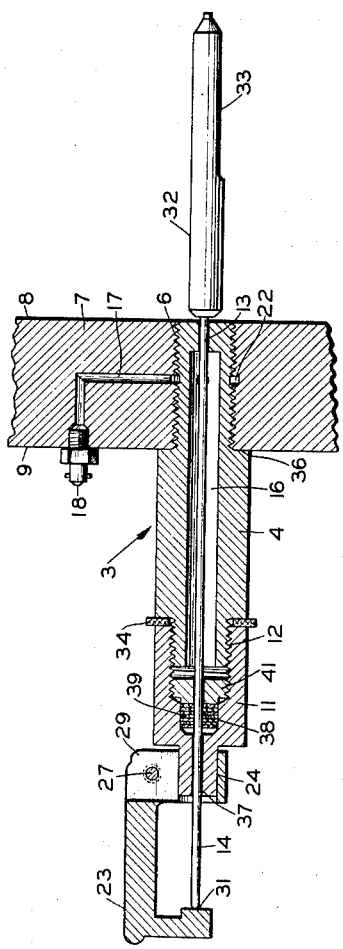
Figure 1 is an elevational cross sectional view taken through a stuffing box assembly embodying the present invention.

In Figure 1, a high-pressure gas-tight stuffing box assembly generally designated as 3 comprises a pipe member 4 threaded to and secured at 6 in gas-tight relation with a wall 7. Wall 7 may be the wall of a meter of any known type.

The wall 7 has a high pressure side 8 which is subjected to the pressure of fluid in the meter. This fluid may be either a liquid or a gas, but generally it is gas. The other face 9 of wall 8 is at a lower pressure, generally atmospheric pressure.

Member 4 has a stuffing box 11 threaded to said member in fluid-tight relation at 12. Member 4 has a first bore 13 fitting rotating shaft 14 rather closely, but allowing free rotation of the shaft. The bore 13 is enlarged to form a second bore 16 adjacent stuffing box 11. Bore 16 may be filled with grease by a grease supply means including a conduit 17 in wall 7, any usual type of pressure grease fitting such as 18 may be used. Fitting 18 may contain a check valve preventing escape of grease outwardly through conduit 17 but allowing additional grease to be forced through fitting 18 into conduit 17, it being noted that member 4 may be provided with an annular channel 19 and a hole 21 to connect conduit 17 with bore 16.

While the construction of conduits 17, 19 and 21 shown in the drawings is preferred, it is obvious that fitting 18 could be attached directly to the outer surface of member 4 and could communicate directly with bore 16 without passing through wall 7 and the major portion of the present invention would still be involved.

In addition to groove 19 I may also provide an annular groove 22 in wall 7. Obviously, one of grooves 19 or 22 could be eliminated and the grease would still get from conduit 17 to hole 21, but I prefer to have both grooves 19 and 22 present.

Stuffing box 11 has a thrust bearing 23 secured thereto at 24 by any suitable means, such as nut 26 and bolt 27 which tighten the joint at 24 by drawing the upper portions 28 and 29 of bearing body 23 together. Obviously, other means for securing bearing body 23 to stuffing box 11 may be substituted, such as a screw threaded connection (not shown) at 24, but the construction shown is preferred. Bearing body 23 has a bearing surface 31 which engages the end of rod 14 and prevents the rod from being extruded through stuffing box 11 because of high pressure fluids on side 8 of wall 7. The present stuffing box is designed to work at any pressure up to 3000 p. s. i., although 1500 p. s. i. is as large a pressure as encountered in general service. A pressure of 1500 p. s. i. will tend to force rod 14 against bearing surface 31. While not shown bearing surface 31 can be provided with an inserted plate in the nature of a hard and polished jewel to receive the thrust of rod 14 if desired. Such jeweled bearings are common.

While not a part of the present invention, rod 14 is generally provided with an enlarged hub section 32 which generally has a flat face 33 slabbed off of one side of the cylindrical surface of 32 to provide a seat for a set screw (not shown) or the like in some actuating lever or other mechanism (not shown).

In order to provide fluid-tight relationship between stuffing box 11 and member 4 I may provide a fiber washer 34 between the same in conjunction with threads 12. However, threads 12 may be enough without fiber washer 34 which may be eliminated. Similarly threads 6 are shown as providing a fluid-tight seal between member 4 and wall 7 and I prefer this construction. However, I may provide a fiber washer (not shown) like washer 34 at shoulder 36 if desired to enhance the seal of threads 6.

Member 4 has a first bore 13 and a second bore 16 as described above and stuffing box 11 has a third bore 37 which fits shaft 14 fairly closely, but which allows free rotation of shaft 14, and this third bore 37 is enlarged to form a fourth bore 38. Bore 38 receives packing rings 39, which are preferably made of graphite. Packing rings 39 fit bore 38 and shaft 14 rather closely but allow free rotation of shaft 14. A gland or follower 41 is provided in bore 38 for retaining graphite rings 39 therein. While other means for securing gland 41 may be provided, I prefer to thread gland 41 in threads 12 of bore 38 as shown and gland 41 is provided with a screw driver slot 42 to aid in assembly.

Figure 2:
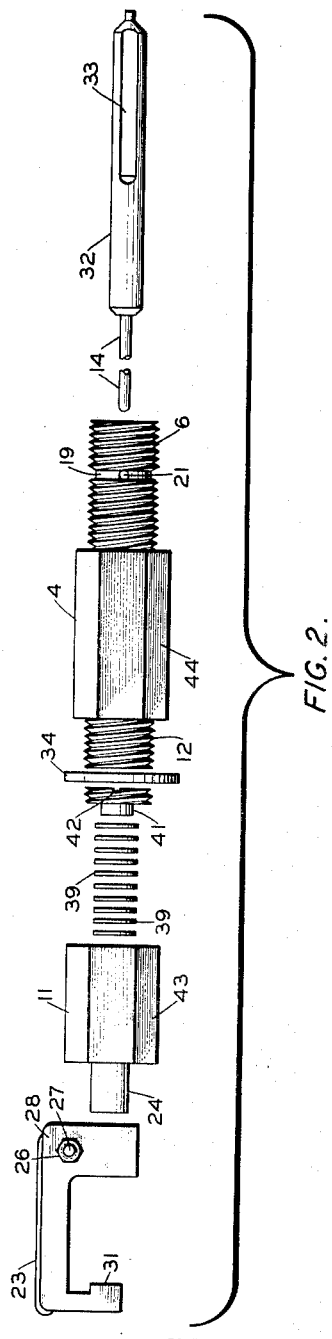
Figure 2 is an exploded elevational view showing the individual parts in elevation that were shown in Figure 1, some of the parts being rotated 90° to show details of construction.

In Figure 2 the parts are in elevation. Stuffing box 11 is preferably provided with a hexagonal exterior with flat surface 43 which enables assembly and disassembly with a wrench. Similar flat surfaces 44 are provided on member 4. Surface 24 is cylindrical. The thrust bearing 23, stuffing box 11, packing rings 39, gland 41, washer 34, member 4 and shaft 14 are all shown as exploded in a longitudinal direction from left to right.

Operation

The operation of the device is self-explanatory. Shaft 14 rotates in bearings 13 and 37 and in rings 39 with the end of the shaft having a thrust bearing on surface 31 due to the pressure of fluid on shaft 14. Shaft 14 is very free to rotate. Fluid cannot escape through the assembly chiefly because of graphite rings 39 along with the grease. At first, grease may be in bore 38 along with rings 39 and additional grease may be added through fitting 18 to fill bore 16. Because gland 41 is on the high pressure side of stuffing box 38 an efficient high-pressure fluid-tight seal is achieved with rings 39. At the same time stuffing box 11 can be unscrewed at 12 from member 4 and removed for service, repair, or replacement without disturbing the alignment of shaft 14 in bore 13. This allows changes to be made in parts 11 and 23 without disturbing the mechanism of the meter (not shown) which mechanism is attached to 32.

The stuffing box shown in the drawings embodies my invention and is shown for purposes of illustration, said invention being defined in the following claims.

Having described my invention, I claim:

1. A high-pressure fluid-tight stuffing box assembly for packing a rotating shaft in a meter, which shaft extends through a wall in the meter from the high pressure side of said wall to the atmospheric pressure side of said wall, comprising in combination a pipe member threaded to and secured to said wall in fluid-tight relation, a stuffing box threaded to and secured to said member in fluid-tight relation on the atmospheric pressure side of said wall, a thrust bearing for the end of said shaft secured to said stuffing box, said member having a first bore fitting said shaft said first bore being enlarged to form a second bore adjacent said stuffing box, said stuffing box having a third bore fitting said shaft, said third bore being enlarged to form a fourth bore adjacent said member, means including a conduit communicating with said second bore for supplying grease to said assembly, a plurality of graphite washers fitting said shaft and disposed in said fourth bore, and a gland threaded into and secured in said fourth bore for retaining said washers in said fourth bore.

2. A high-pressure fluid-tight stuffing box assembly for packing a rotating shaft, which shaft extends through a wall from the high pressure side of said wall to the atmospheric pressure side of said wall, comprising in combination a pipe member secured to said wall in fluid-tight relation, a stuffing box threaded to and secured to said member in fluid-tight relation on the atmospheric pressure side of said wall, a thrust bearing for the end of said shaft secured to said stuffing box, said member having a first bore fitting said shaft, said first bore being enlarged to form a second bore adjacent said stuffing box, said stuffing box having a third bore fitting said shaft, said third bore being enlarged to form a fourth bore adjacent said member, means including a conduit communicating with said second bore for supplying grease to said assembly, a plurality of graphite washers fitting said shaft and disposed in said fourth bore, and a gland secured in said fourth bore for retaining said washer in said fourth bore.

3. A high-pressure fluid-tight stuffing box assembly for packing a rotating shaft, which shaft extends through a wall from the high pressure side of said wall to the atmospheric pressure side of said wall, comprising in combination a pipe member secured to said wall in fluid-tight relation, a stuffing box secured to said member in fluid-tight relation on the atmospheric pressure side of said wall, a thrust bearing for the end of said shaft secured to said stuffing box, said member having a first bore fitting said shaft, said first bore being enlarged to form a second bore adjacent said stuffing box, said stuffing box having a third bore fitting said shaft, said third bore being enlarged to form a fourth bore adjacent said member, means including a conduit communicating with said second bore for supplying grease to said assembly, a plurality of washers fitting said shaft and disposed in said fourth bore, and a gland secured in said fourth bore for retaining said washers in said fourth bore.

4. A high-pressure fluid-tight stuffing box assembly for packing a rotating shaft in a meter, which shaft extends through a wall in the meter from the high pressure side of said wall to the atmospheric pressure side of said wall, comprising in combination a pipe member threaded to and secured to said wall in fluid-tight relation, a stuffing box threaded to and secured to said member in fluid-tight relation on the atmospheric pressure side of said wall, a thrust bearing for the end of said shaft secured to said stuffing box, said member having a first bore fitting said shaft, said first bore being enlarged to form a second bore adjacent said stuffing box, said stuffing box having a third bore fitting said shaft, said third bore being enlarged to form a fourth bore adjacent said member, a plurality of graphite washers fitting said shaft and disposed in said fourth bore, and a gland threaded into and secured in said fourth bore for retaining said washers in said fourth bore.

5. A high-pressure fluid-tight stuffing box assembly for packing a rotating shaft, which shaft extends through a wall from the high pressure side of said wall to the atmospheric pressure side of said wall, comprising in combination a pipe member secured to said wall in fluid-tight relation, a stuffing box secured to said member in fluid-tight relation on the atmospheric pressure side of said wall, a thrust bearing for the end of said shaft secured to said stuffing box, said member having a first bore fitting said shaft, said first bore being enlarged to form a second bore adjacent said stuffing box, said stuffing box having a third bore fitting said shaft, said third bore being enlarged to form a fourth bore adjacent said member, a plurality of washers fitting said shaft and disposed in said fourth bore, and a gland secured in said fourth bore for retaining said washers in said fourth bore.

6. A high-pressure fluid-tight stuffing box assembly for packing a rotating shaft in a meter, which shaft extends through a wall in the meter from the high pressure side of said wall to the atmospheric pressure side of said wall, comprising in combination a pipe member threaded to and secured to said wall in fluid-tight relation, a stuffing box threaded to and secured to said member in fluid-tight relation on the atmospheric pressure side of said wall, said member having a first bore fitting said shaft, said first bore being enlarged to form a second bore adjacent said stuffing box, said stuffing box having a third bore fitting said shaft, said third bore being enlarged to form a fourth bore adjacent said member, a plurality of graphite washers fitting said shaft and disposed in said fourth bore, and a gland threaded into and secured in said fourth bore for retaining said washers in said fourth bore.

7. A high-pressure fluid-tight stuffing box assembly for packing a rotating shaft, which shaft extends through a wall from the high pressure side of said wall to the atmospheric pressure side of said wall, comprising in combination a pipe member secured to said wall in fluid-tight relation, a stuffing box secured to said member in fluid-tight relation on the atmospheric pressure side of said wall, said member having a first bore fitting said shaft, said first bore being enlarged to form a second bore adjacent said stuffing box, said stuffing box having a third bore fitting said shaft, said third bore being enlarged to form a fourth bore adjacent said member, a plurality of washers fitting said shaft and disposed in said fourth bore, and a gland secured in said fourth bore for retaining said washers in said fourth bore.

WALTER F. DELAMETTER.

REFERENCES CITED

The following references are of record in the file of this patent:

UNITED STATES PATENTS

| Number | Name | Date |
|---|---|---|
| 872,366 | Planck | Dec. 3, 1907 |
| 1,666,013 | Jackson | Apr. 10, 1928 |
| 2,377,526 | Side | June 5, 1945 |